UNITED STATES PATENT OFFICE.

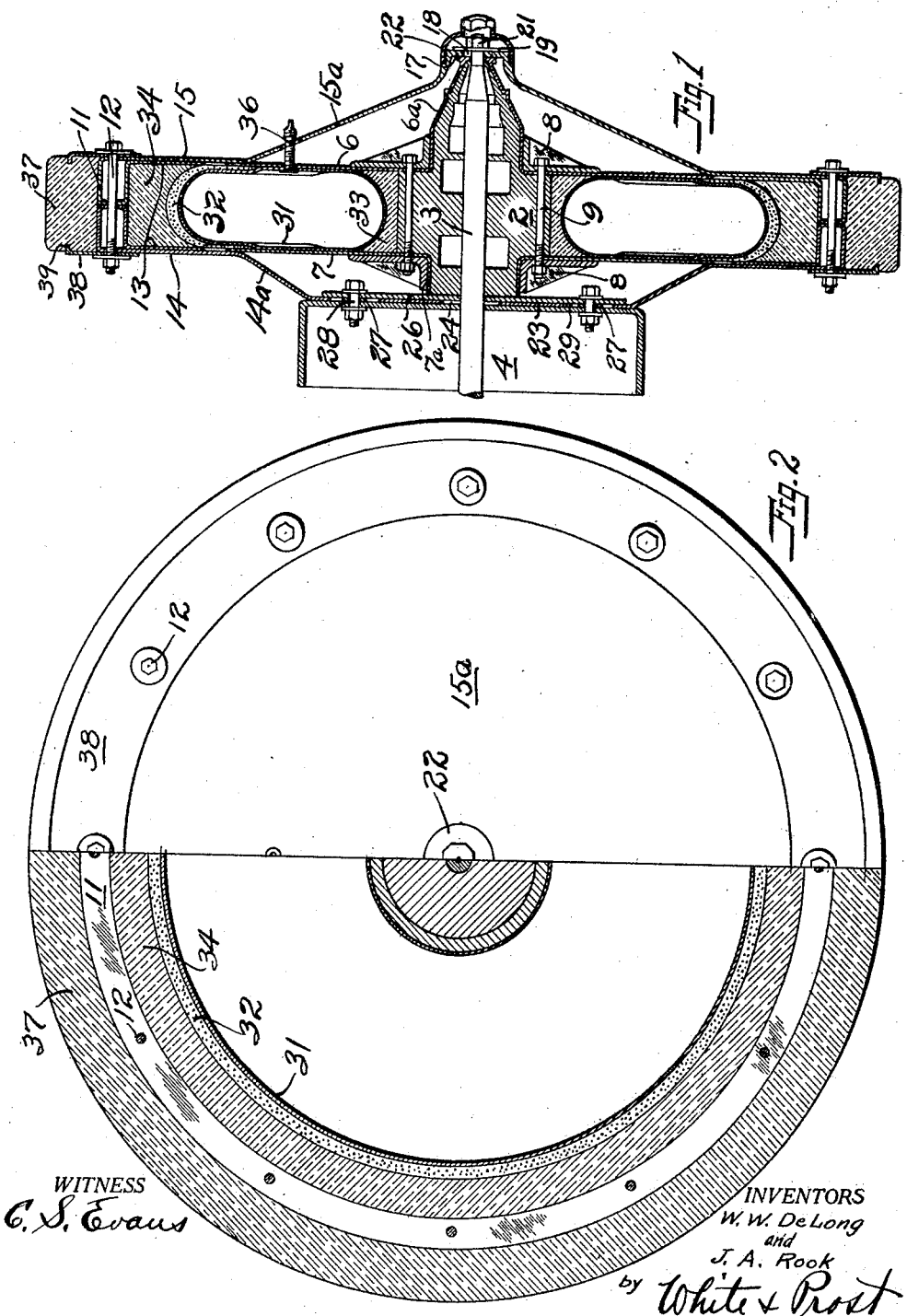

WILLARD W. DE LONG AND JAMES A. ROOK, OF BERKELEY, CALIFORNIA.

VEHICLE-WHEEL.

1,394,286.    Specification of Letters Patent.    Patented Oct. 18, 1921.

Application filed August 13, 1918. Serial No. 249,666.

*To all whom it may concern:*

Be it known that we, WILLARD W. DE LONG and JAMES A. ROOK, citizens of the United States, and residents of Berkeley, county of Alameda, and State of California, have invented a new and useful Vehicle-Wheel, of which the following is a specification.

Our invention relates to vehicle wheels.

An object of the invention is to provide a wheel having the resilience of the common pneumatic tire wheel, but which is proof against disablement through puncture of the pneumatic cushion.

Another object of our invention is to provide a wheel having a separate hub and rim, between which a resilient tube containing air under pressure is disposed so as to absorb vibration and shock.

The invention possesses other features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to the drawings:

Figure 1 is a vertical section through the wheel. The plane of section is coincident with the axis of the wheel.

Fig. 2 is an outer side elevation of the wheel, the left half of the housing being removed to disclose the structure.

In Fig. 1 our invention is shown as an automobile rear wheel in which a hub 2 is keyed or otherwise suitably attached to the shaft 3 carrying the brake drum 4. Surrounding the hub upon the outside is a pressed steel plate 6 which preferably is provided with a conical extension $6^a$ which forms a sheath for the outer end of the hub. On the inside of the wheel the plate 7 is arranged spaced from and parallel to the plate 6. Plate 7 is provided with an annular flange $7^a$ engaging the hub. Annular collars 8 surrounding the hub on the outside of the plates stiffen the connection between the plates and hub, and bolts 9 secure the parts rigidly together.

The rim 11 is preferably formed in two sections secured together by bolts 12. The rim parts are preferably of pressed steel in the form of an annular ring of box-like section. A plate 13 extends inwardly from each rim and when the rims are bolted together, these plates are parallel, spaced apart, and are radially alined with the plates 6 and 7.

The rim sections are also respectively provided with plates 14 and 15 lying outside of and contiguous to plates 13, and forming a housing which incloses the portion of the wheel within the rim. The outer plate 15 is provided with a conical or bell-like extension $15^a$ which clears the hub and is formed at the center with a flange 17 surrounding an aperture 18. The flange lies contiguous to the hub sheath $6^a$ and the shaft passes through the aperture 18 clearing the flange all around. A washer 19 is assembled on the end of the shaft against the flange 17 and a nut 21 retains the washer in place, thus preventing the parts from longitudinal displacement upon the shaft. A small clearance is left between the flange 17 and the sheath $6^a$ and washer 19 so that radial movement of the housing $15^a$ about the shaft is permitted, the aperture 18 being sufficiently large to allow such movement. A cap 22 is threaded over the flange 17 to form a tight closure of the housing at this point.

On the inside of the wheel the plate 14 is provided with a similar conical or bell-like extension $14^a$ formed with a flange 23 having an aperture 24 at the center through which the shaft extends. The flange 23 lies contiguous to the side of the brake drum on one side and to a plate 26 upon the other side. The plate 26 lies against the end of the hub 2 and is spaced from the brake drum by the washers 27. Bolts 28 passing through drum wall, washers and plate 26 rigidly secure the parts together, but permit the inclosed flange 23 of the wheel housing free radial movement in respect of the shaft, apertures 29 being formed in the flange about each washer. From the above it will be clear that relative radial movement may take place between the housing and rim on the outside, and the hub and shaft on the inside, but that the connection between the relatively movable parts is such as to exclude dirt and moisture from the inside of the housing.

Means are provided for giving a resilient connection between the separate outer or rim portion of the wheel and the inner or hub portion. An annular tube 31, preferably of rubber, and inflated with air under pressure, is disposed about the hub and within the rim. The tube is of elongated transverse section and is confined between the side plates 6—7 and 13. To avoid injuring the tube between the relatively movable plates 6—7 and 13 a protective strip 32 of leather or rubber or comparable material is disposed about the portion of the tube adjacent to the edges of the plates, and these edges are preferably beveled to prevent injury to the strip.

Preferably an annular cushion 33 of resilient material is interposed between the tube 31 and the hub, and a similar cushion 34 is placed between the tube and the rim. The tube may be divided into compartments if desired or left as shown in Fig. 2, inclosing a single chamber into which air is forced under suitable pressure through the valve stem 36, which extends through a suitable aperture in the housing.

The rim is provided with a tire or tread 37, and preferably this tread is of solid rubber which is conveniently attached to the rim by means of annular rings 38 having flanges 39 engaging the body of the tread. The rings are secured to the rim by the bolts 12.

Shocks or vibrations due either to the character of ground over which the wheel is moving or to the vehicle itself from its momentum in vertical movement, are absorbed by the resilient tube and cushions. Such shocks cause a relative radial movement between the separated rim and hub sections of the wheel, the plates 6 and 7 sliding within the housing walls 14 and 15.

We claim:

1. A vehicle wheel comprising a hub having a cylindrical flange thereon, parallel side plates on each side of said flange and provided with flanges encircling the hub, a rim disposed about said hub, housing plates inclosing the hub fixed to said rim, the outer portions of said plates being parallel and forming a sliding engagement with said hub plates, parallel annular plates fixed on said housing plates and spaced from and radially alined with said hub plates, a resilient cushion surrounding the flange between said side plates, a second resilient cushion on the rim between said parallel annular plates, a resilient air tube interposed between said housing and said rim cushions, and a protective strip interposed between said tube and the edges of said parallel annular plates and said hub plates.

2. A vehicle wheel comprising a hub, parallel side plates, on each side of the hub, having hub flanges, means for securing the plates to the hub, a resilient cushion having a concave face surrounding the hub and retained between the plates, a pair of dished housing plates inclosing the hub and converging outwardly toward and bearing on the outer portions of the side plates, rim parts on the housing plates on which a rubber tread is mounted, an outer resilient cushion on the inner face of the rim parts, and a resilient air cushion between said cushions and supported laterally by the side plates, the outer cushion having a concaved inner face, and a protective strip arched about the air cushion and having side flanges bearing on the inner faces of the inner plates.

In testimony whereof, we have hereunto set our hands, the said WILLARD W. DE LONG at San Francisco, Cal., this 6th day of July, 1918, and the said JAMES A. ROOK at San Francisco, Cal., this 3d day of August, 1918.

WILLARD W. DE LONG.
JAMES A. ROOK.